US012638926B2

(12) United States Patent　　　　(10) Patent No.:　US 12,638,926 B2
Yeh et al.　　　　　　　　　　　　　(45) Date of Patent:　　May 26, 2026

(54) EXTENDED REALITY DEVICE AND CONTROL METHOD THEREFOR

(71) Applicant: ASUSTEK COMPUTER INC., Taipei (TW)

(72) Inventors: Yuan-Kai Yeh, Taipei (TW); Peng Sun, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 0 days.

(21) Appl. No.: 19/028,175

(22) Filed: Jan. 17, 2025

(65) Prior Publication Data

US 2026/0118966 A1　　　Apr. 30, 2026

(30) Foreign Application Priority Data

Oct. 29, 2024　(TW) ................................. 113141168

(51) Int. Cl.
　　*G06F 3/01*　　　　(2006.01)
　　*G06F 3/02*　　　　(2006.01)
　　*G06F 3/0338*　　　(2013.01)
　　*G06F 3/0482*　　　(2013.01)

(52) U.S. Cl.
　　CPC .............. *G06F 3/017* (2013.01); *G06F 3/013* (2013.01); *G06F 3/02* (2013.01); *G06F 3/0338* (2013.01); *G06F 3/0482* (2013.01)

(58) Field of Classification Search
　　CPC ...................................................... G06F 3/017
　　See application file for complete search history.

(56) References Cited

U.S. PATENT DOCUMENTS

| | | | | |
|---|---|---|---|---|
| 11,467,675 B1 * | 10/2022 | Hooker | ................... | G06F 3/017 |
| 2018/0357978 A1 * | 12/2018 | Liao | ......................... | G06F 3/147 |
| 2021/0385299 A1 * | 12/2021 | Liao | ...................... | A63F 13/211 |
| 2022/0300236 A1 * | 9/2022 | Baijal | ..................... | G06F 3/013 |

FOREIGN PATENT DOCUMENTS

| | | |
|---|---|---|
| CN | 110308841 A | 10/2019 |
| CN | 106682117 B | 3/2020 |
| CN | 113813599 A | 12/2021 |
| CN | 115808972 A | 3/2023 |
| CN | 116909391 A | 10/2023 |
| CN | 118363462 A | 7/2024 |
| TW | 201403386 A | 1/2014 |
| TW | 201708881 A | 3/2017 |
| TW | 202301079 A | 1/2023 |

* cited by examiner

*Primary Examiner* — Chun-Nan Lin
(74) *Attorney, Agent, or Firm* — MUNCY, GEISSLER, OLDS & LOWE, P.C.

(57)　　　　　　　ABSTRACT

An extended reality device including a gesture detection module, an eye tracking module, and a processing unit is provided. The processing unit is electrically coupled to the gesture detection module and the eye tracking module, and configured to display a shortcut window in response to a first operation, where the shortcut window includes a plurality of options; select one of the plurality of options in response to a second operation; and execute a function corresponding to the selected option in response to a third operation. At least two of the first operation, the second operation, and the third operation are gesture operations. A control method for the extended reality device is further provided.

11 Claims, 17 Drawing Sheets

100

EXTENDED REALITY DEVICE AND CONTROL METHOD THEREFOR

CROSS-REFERENCE TO RELATED APPLICATION

This application claims the priority benefit of Taiwan Application Serial No. 113141168, filed on Oct. 29, 2024. The entirety of the above-mentioned patent application is hereby incorporated by reference herein and made a part of specification.

BACKGROUND OF THE INVENTION

Field of the Invention

The disclosure relates to an extended reality device and a control method therefor.

Description of the Related Art

An extended reality (XR) device refers to a device that combines real and virtual environments and human-computer interaction. X represents variables, including augmented reality (AR), mixed reality (MR), virtual reality (VR), and the like. The objective of the extended reality device is to convert a real world into a digital mapping world and allow interaction with the digital mapping world.

The settings and operation manner of the extended reality device are significantly different from those of a current handheld electronic device (such as mobile phone, a tablet, and a notebook computer). When the extended reality device is used with an operation interface for the handheld electronic device (such as searching for an application), it is not easy to operate, and the user is prone to fatigue, resulting in a poor user experience.

BRIEF SUMMARY OF THE INVENTION

The disclosure provides an extended reality device, including a gesture detection module, an eye tracking module, and a processing unit. The processing unit is electrically coupled to the gesture detection module and the eye tracking module, and configured to display a shortcut window in response to a first operation, where the shortcut window includes a plurality of options; select one of the plurality of options in response to a second operation; and execute a function corresponding to the selected option in response to a third operation. At least two of the first operation, the second operation, and the third operation are gesture operations.

The disclosure further provides a control method, applicable to an extended reality device. The extended reality device includes a gesture detection module. The control method includes the following steps. First, a shortcut window is displayed in response to a first operation. The shortcut window includes a plurality of options. Then, one of the plurality of options is selected in response to a second operation. Next, a function corresponding to the selected option is executed in response to a third operation. At least two of the first operation, the second operation, and the third operation are gesture operations.

Through the extended reality device and the control method therefor provided in the disclosure, a user quickly activates a shortcut window through a gesture operation or an eye movement, and selects an option on the shortcut window and executes the option. In this way, problems of uneasy operation and poor user experience of the extended reality device are effectively resolved.

DETAILED DESCRIPTION OF THE EMBODIMENTS

More detailed descriptions of specific embodiments of the disclosure are provided below with reference to the schematic diagrams. The features and advantages of the disclosure are described more clearly according to the following description and claims. It should be noted that all of the drawings use very simplified forms and imprecise proportions, only being used for assisting in conveniently and clearly explaining the objective of the embodiments of the disclosure.

Figure 1:
FIG. 1 is a schematic block diagram of an extended reality device according to a first embodiment of the disclosure.
Figure 1:
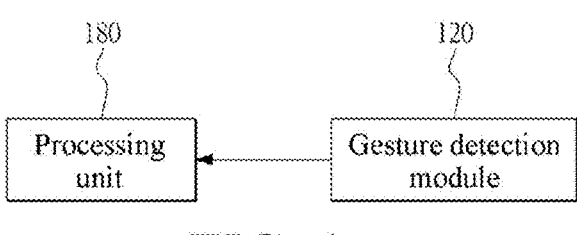
Figure 2:
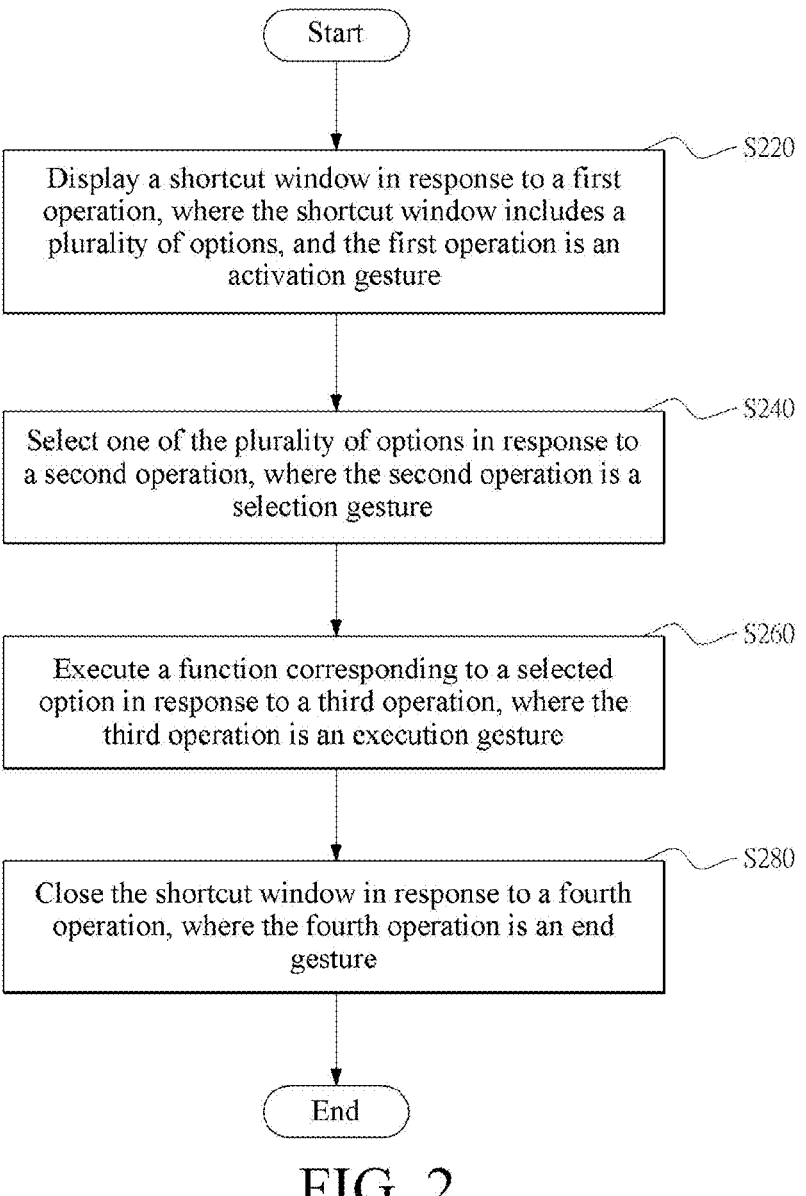
FIG. 2 is a flowchart of a control method according to a first embodiment of the disclosure.

FIG. 1 is a schematic block diagram of an extended reality device 100 according to an embodiment of the disclosure. FIG. 2 is a flowchart of a control method according to an embodiment of the disclosure. The control method is applicable to the extended reality device 100 shown in FIG. 1.

As shown in FIG. 1, the extended reality device 100 includes a gesture detection module 120 and a processing unit 180. The gesture detection module 120 is configured to detect a gesture of a user. The processing unit 180 is electrically coupled to the gesture detection module 120 and is configured to receive detection information from the gesture detection module 120 to perform a corresponding operation. In an embodiment, the gesture detection module 120 includes a camera, configured to capture a gesture image of the user.

Specifically, the processing unit 180 obtains a gesture image (such as a peripheral contour of the gesture) through the gesture detection module 120, and compares the obtained gesture image with a preset image to determine whether the gesture of the user meets a preset gesture. After it is determined that the gesture of the user meets the preset gesture, an operation corresponding to the preset gesture is performed. In an embodiment, the processor 180 pre-stores images (or image features) corresponding to an activation gesture, a selection gesture, a determining gesture, and an end gesture. Then, the processing unit 180 compares the obtained gesture image with an image of the preset gesture, to determine a type of an operation to be performed by the user.

Referring to FIG. 2, the control method provided in this embodiment includes the following steps.

First, as shown in step S220, a shortcut window is displayed in response to a first operation. The shortcut window includes a plurality of options. The first operation is an activation gesture.

Figure 3A:
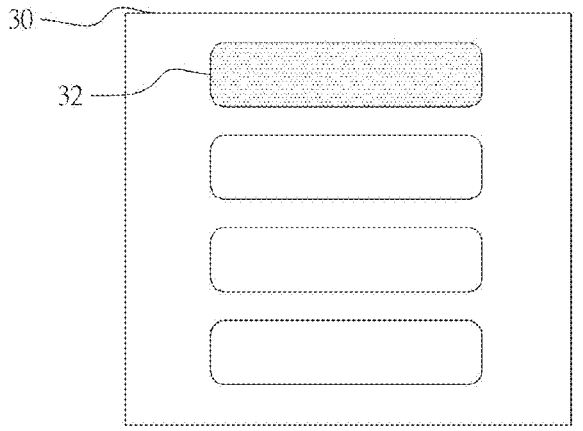
FIG. 3A shows an embodiment of step S220.
Figure 3A:
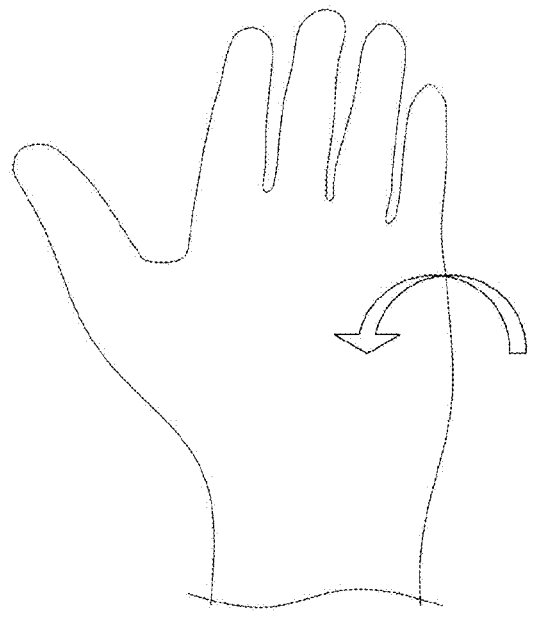

Referring to FIG. 3A together, FIG. 3A shows an embodiment of step S220. In the figure, a field of view of the user and the gesture of the user are integrated and displayed on the same page for ease of description. This does not indicate that the gesture of the user is definitely displayed in the field of view of the user. During actual application, when the user performs an operation, the gesture falls within the field of view to facilitate determining, or falls outside the field of view to avoid interfering with content displayed within the field of view. As shown in the figure, in an embodiment, the activation gesture is a palm turning gesture. After detecting the palm turning gesture, the processing unit 180 immediately calls a shortcut window 30, and displays the shortcut window 30 in the field of view of the user. A plurality of options 32 is displayed on the shortcut window 30.

Then, as shown in step S240, one of the plurality of options 32 is selected in response to a second operation. The second operation is a selection gesture. Next, as shown in step S260, a function corresponding to the selected option 32 is executed in response to a third operation. The third operation is an execution gesture.

Figure 3B:
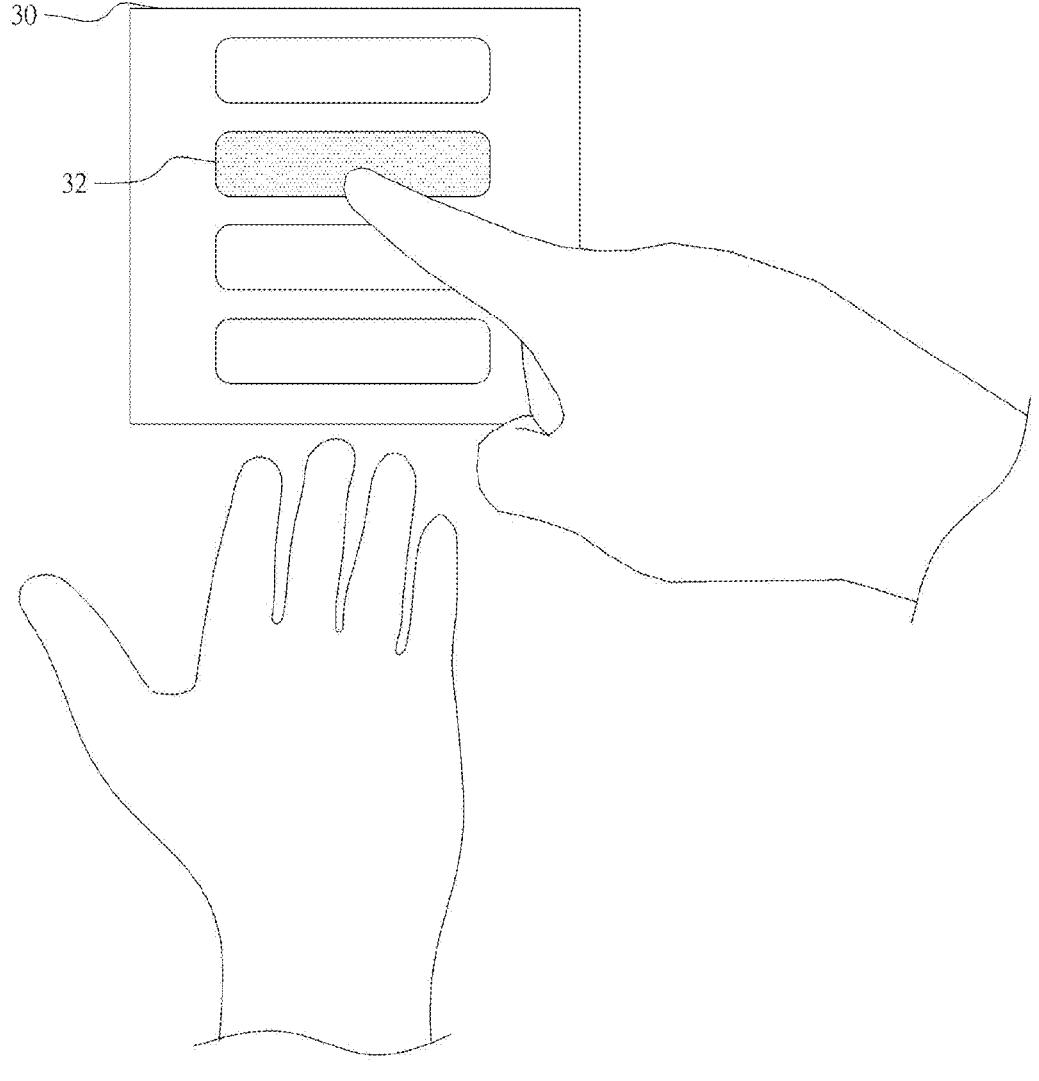
FIG. 3B shows an embodiment of steps S240 and S260.

Referring to FIG. 3B together, FIG. 3B shows an embodiment of steps S240 and S260. As shown in the figure, in an embodiment, the selection gesture is a finger (such as an index finger) pointing gesture that points to an option to be selected by the user. The execution gesture is a finger (such as an index finger) tap gesture to determine an option to be executed.

Specifically, the processing unit 180 determines a currently selected option according to an up-down position or a finger direction of the selection gesture, and moves the option 32 to be selected. In addition, to facilitate the user to determine the currently selected option 32, the selected option 32 is highlighted, illuminated, or displayed in another manner to prompt the user. Then, when detecting the execution gesture, the processing unit 180 executes an application or instruction corresponding to the currently selected option 32.

In addition, it should be noted that, in this embodiment, after the user turns the palm of the left hand to call the shortcut window 30, the left hand maintains a back-facing gesture (that is, a gesture when the first operation ends), and the processing unit 180 maintains the shortcut window in the field of view when detecting that the user maintains the gesture of the back of the hand facing upward. The operations of the foregoing steps S240 and S260 are performed by using the right hand in a case that the left hand of the user maintains a gesture of the back of the left hand of the user facing upward.

First, the foregoing left and right hands are merely an example of the disclosure. In actual application, turning the right hand is alternatively set as the gesture corresponding to the first operation. Second, in the foregoing embodiment, after the first operation, the user needs to maintain the gesture of the back of the hand facing upward, to maintain the shortcut window in the field of view and perform an option operation. When detecting that the gesture disappears, the processing unit 180 immediately closes the shortcut window and pops up the option operation. In other embodiments, after detecting that the user executes the palm turning gesture, the processing unit 180 immediately calls the shortcut window to be displayed in the field of view. The processing unit 180 closes the shortcut window only after detecting the end gesture or executing the specific option 32.

Then, as shown in step S280, the shortcut window 30 is closed in response to a fourth operation. The fourth operation is an end gesture.

Figure 3C:
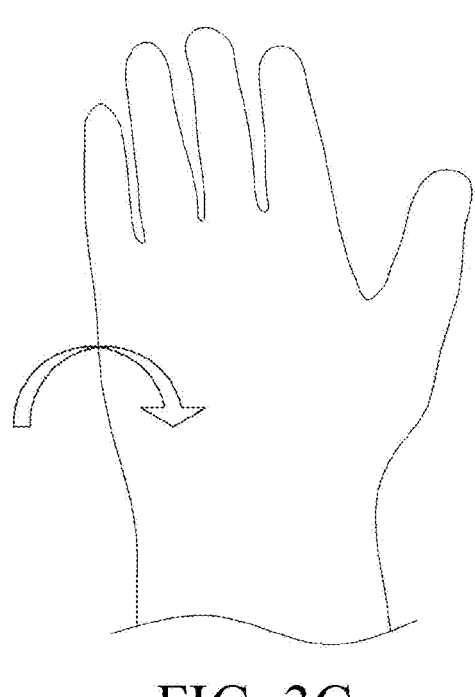
FIG. 3C shows an embodiment of step S280.

Referring to FIG. 3C together, FIG. 3C shows an embodiment of step S280. As shown in the figure, in an embodiment, the end gesture is a palm down gesture.

It should be noted that, in this embodiment, the first operation, the second operation, the third operation, and the fourth operation are all gesture operations. The activation gesture, the selection gesture, the execution gesture, and the end gesture are different from each other.

Figure 4:
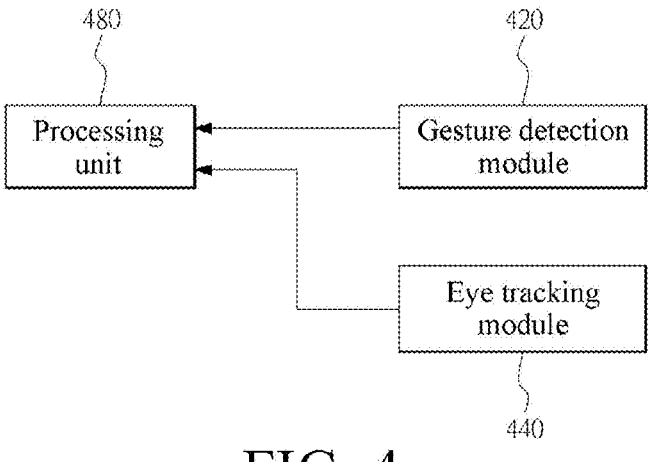
FIG. 4 is a schematic block diagram of an extended reality device according to a second embodiment of the disclosure.
Figure 5:
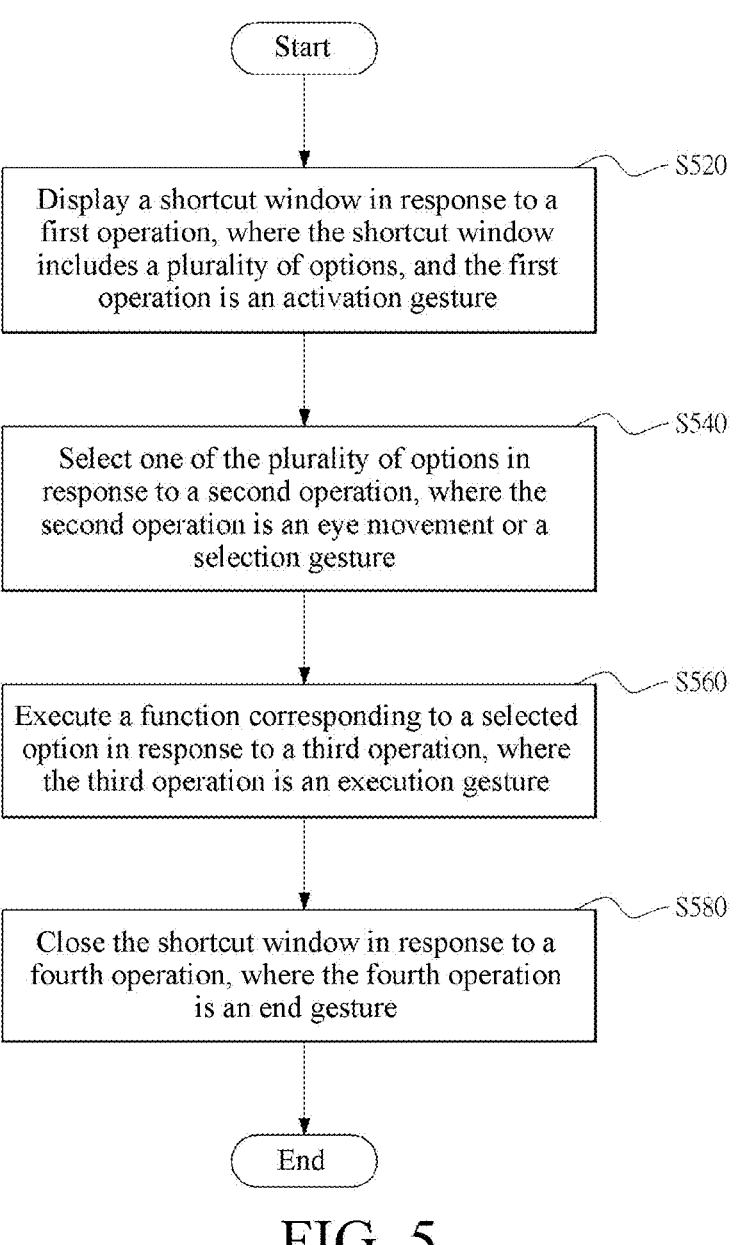
FIG. 5 is a flowchart of a control method according to a second embodiment of the disclosure.

FIG. 4 is a schematic block diagram of an extended reality device 400 according to another embodiment of the disclosure. FIG. 5 is a flowchart of a control method according to another embodiment of the disclosure. The control method is applicable to the extended reality device 400 shown in FIG. 4.

As shown in FIG. 4, the extended reality device 400 includes a gesture detection module 420, an eye tracking module 440, and a processing unit 480. The gesture detection module 420 is configured to detect a gesture of a user. The eye tracking module 440 is configured to detect an eye movement of the user. The processing unit 480 is electrically coupled to the gesture detection module 420 and the eye tracking module 440, and is configured to receive detection information from the gesture detection module 420 and the eye tracking module 440 to perform a corresponding operation.

Specifically, the processing unit 480 obtains a gesture image (such as a peripheral contour of the gesture) through the gesture detection module 420, and compares the obtained gesture image with a preset image to determine whether the gesture of the user meets a preset gesture. After it is determined that the gesture of the user meets the preset gesture, a control action corresponding to the preset gesture is executed. In addition, the processing unit 480 also analyzes an eye pattern through the eye tracking module 440 to determine the eye movement of the user. In an embodiment, the processing unit 480 analyzes a relative position of a black part of the eye relative to the entire eye through the eye tracking module 440, determines a line-of-sight direction of the user, and executes a corresponding control action.

In an embodiment, the extended reality device 400 includes a head-mounted device 410, and the eye tracking module 440 and the processing unit 480 are arranged in the head-mounted device 410. The gesture detection module 420 is an independent device, and communicates with the head-mounted device 410 in a wired or wireless manner.

As shown in FIG. 5, the control method provided in this embodiment includes the following steps.

First, as shown in step S520, a shortcut window 30 is displayed in response to a first operation. The shortcut window 30 includes a plurality of options 32. The first operation is an activation gesture. In an embodiment, the first operation is the activation gesture shown in FIG. 3A.

Then, as shown in step S540, one of the plurality of options 32 is selected in response to a second operation. The second operation is an eye movement.

Next, as shown in step S560, a function corresponding to the selected option 32 is executed in response to a third operation. The third operation is a gesture operation.

Figure 6:
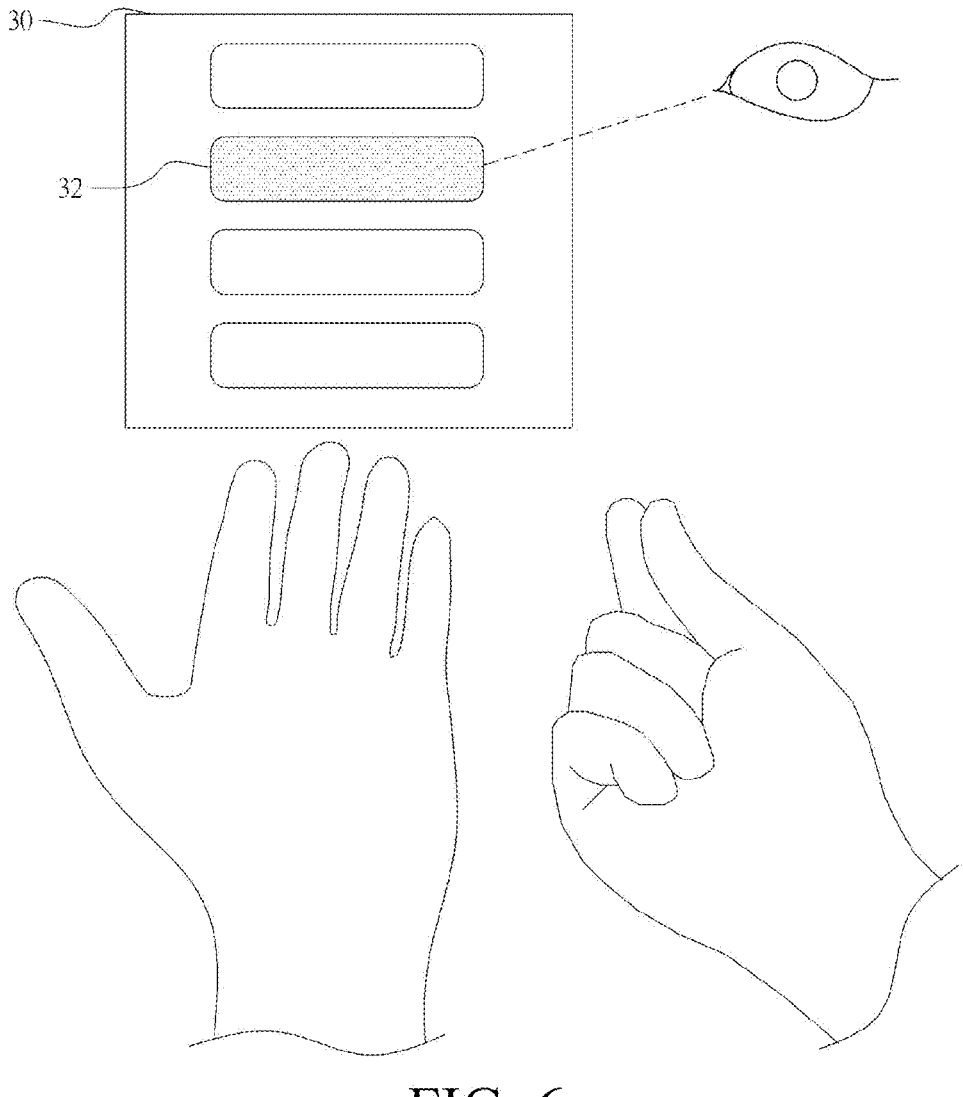
FIG. 6 shows an embodiment of steps S540 and S560.

Referring to FIG. 6 together, FIG. 6 shows an embodiment of steps S540 and S560. In the figure, a field of view of the user, the eye pattern, and the gesture of the user are integrated on the same page for ease of description. During actual application, in an embodiment, the eye pattern is displayed in the field of view (or an interface) of the user, to facilitate the user to determine a control direction of the eye. In addition, when the user performs the gesture operation, the gesture falls within the field of view to facilitate determining, or falls outside the field of view to avoid interfering with content displayed within the field of view.

As shown in the figure, when detecting, through the eye tracking module 440, that the eye of the user moves up or down, the processing unit 480 moves the selected option 32 according to a movement direction of the eye. Then, when the processing unit 480 detects, through the gesture detection module 420, that the user executes an execution gesture (that is, the third operation), in an embodiment, as shown in the figure, a gesture of the thumb of the right hand contacting the index finger is an execution gesture, and an application or instruction corresponding to the currently selected option 32 is executed immediately.

Then, as shown in step S580, the shortcut window 30 is closed in response to a fourth operation. The fourth operation is an end gesture. In an embodiment, the fourth operation is the end gesture shown in FIG. 3C.

It should be noted that, the second operation is an eye movement, and the third operation is a gesture operation. In other embodiments, the second operation is an eye movement or a gesture operation, and an operation action first detected by the processing unit 480 is from the eye tracking module 440 or the gesture detection module 420. In addition, the third operation is alternatively an eye movement, such as an eye gaze action. When detecting that the eye does not move for more than a preset time, the processing unit 480 immediately executes the application or instruction corresponding to the currently selected option 32.

Figure 7:
FIG. 7 is a schematic block diagram of an extended reality device according to a third embodiment of the disclosure.
Figure 7:
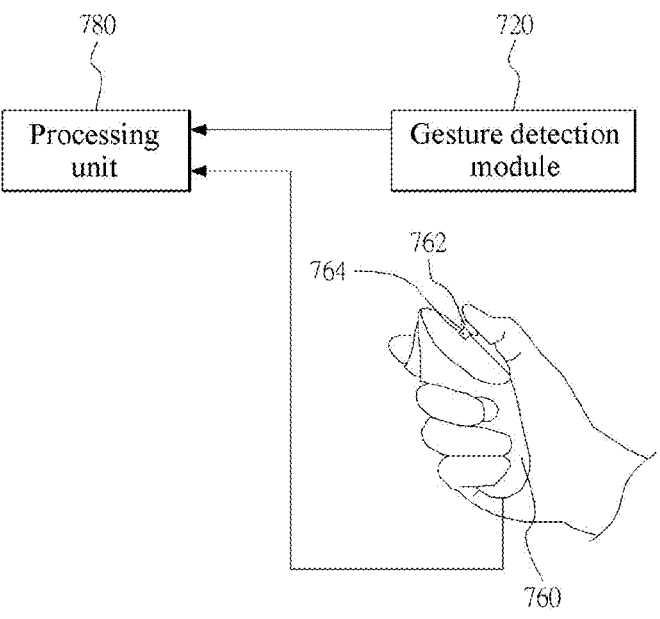
Figure 8:
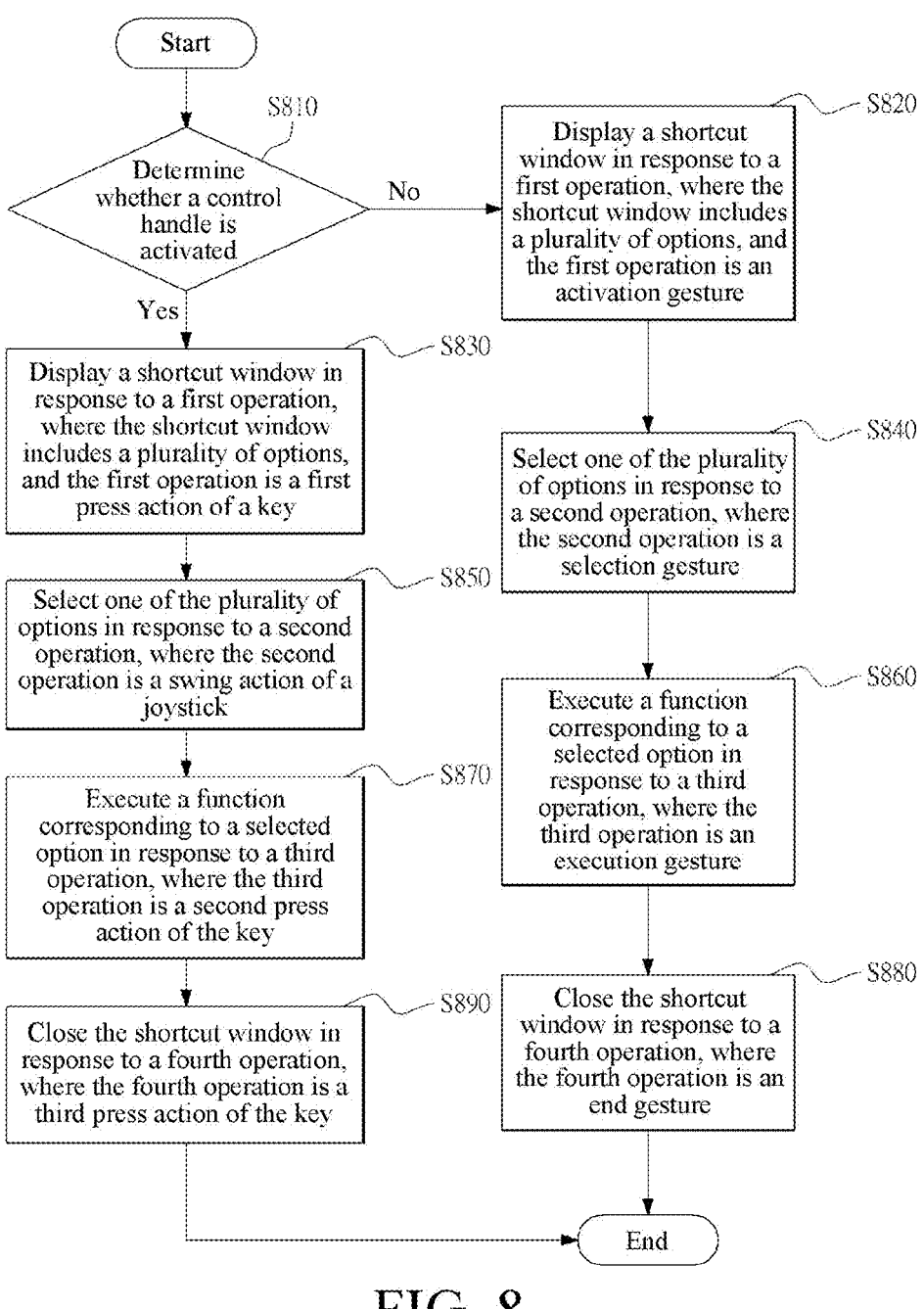
FIG. 8 is a flowchart of a control method according to a third embodiment of the disclosure.

FIG. 7 is a schematic block diagram of an extended reality device 700 according to another embodiment of the disclosure. FIG. 8 is a flowchart of a control method according to another embodiment of the disclosure. The control method is applicable to the extended reality device 700 shown in FIG. 7.

As shown in FIG. 7, the extended reality device 700 includes a gesture detection module 720, a control handle 760, and a processing unit 780. The gesture detection module 720 is configured to detect a gesture of a user. The control handle 760 includes a key 762 and a joystick 764, and is configured to be operated by the user to generate an input signal. The processing unit 780 is electrically coupled to the gesture detection module 720 and the control handle 760, and is configured to receive detection information from the gesture detection module 720 and the input signal from the control handle 760 to perform a corresponding operation.

Specifically, the processing unit 780 obtains a gesture image (such as a peripheral contour of the gesture) through the gesture detection module 720, and compares the obtained gesture image with a preset image to determine whether the gesture of the user meets a preset gesture. After it is determined that the gesture of the user meets the preset gesture, a control action corresponding to the preset gesture is executed. In addition, the processing unit 780 receives the input signal through the control handle 760. The input signal is a press signal corresponding to the key 762 or a swing signal corresponding to the joystick 764.

As shown in FIG. 8, the control method provided in this embodiment includes the following steps.

First, as shown in step S810, whether the control handle 760 is activated is determined. This step is performed by the processing unit 780. The processing unit 780 communicates with the control handle 760 in a wired or wireless manner, to determine whether the control handle 760 is activated.

When the control handle 760 is not activated, the process goes to step S720, and the processing unit 780 performs the control process through the gesture detection module 720. When the control handle 760 is activated, the process goes to step S830, and the processing unit 780 performs the control process through the control handle 760.

When the control handle 760 is not activated, first, as shown in step S820, a shortcut window 30 is displayed in response to a first operation. The shortcut window 30 includes a plurality of options 32. The first operation is an activation gesture. Then, as shown in step S840, one of the plurality of options 32 is selected in response to a second operation. The second operation is a selection gesture. Next, as shown in step S860, a function corresponding to the selected option 32 is executed in response to a third operation. The third operation is an execution gesture. Then, as shown in step S880, the shortcut window 30 is closed in response to a fourth operation. The fourth operation is an end gesture.

A control process of the foregoing steps S820, S840, S860, and S880 is similar to that in the embodiment in FIG. 2. Details are not described herein again.

Figure 9A:
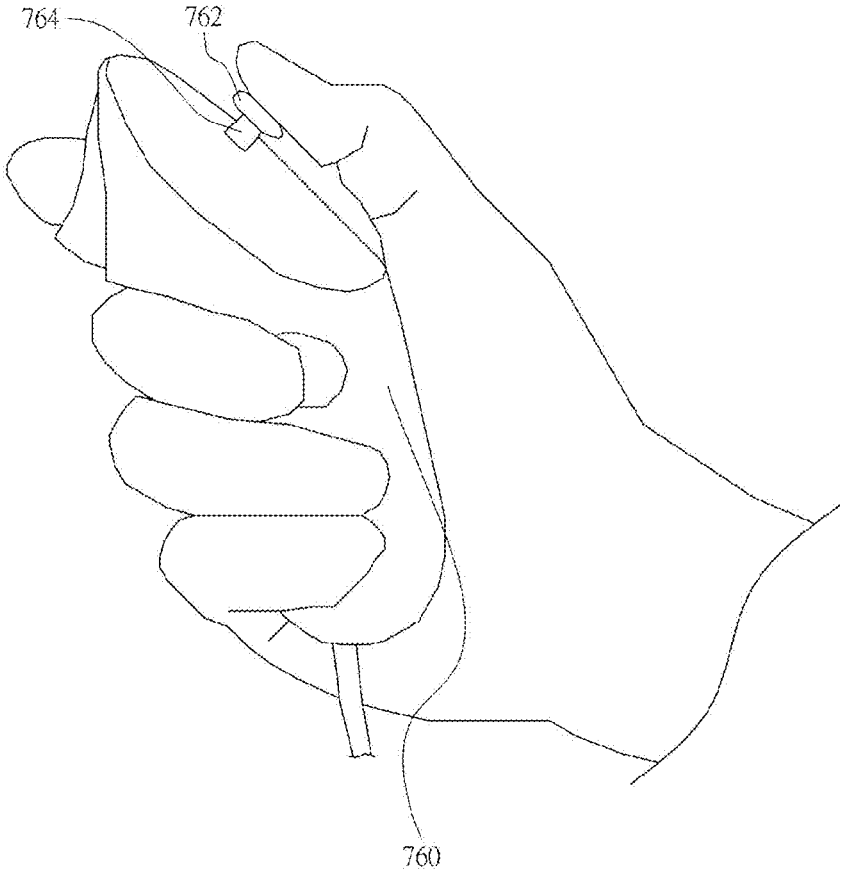
FIG. 9A shows an embodiment of step S830.
Figure 9B:
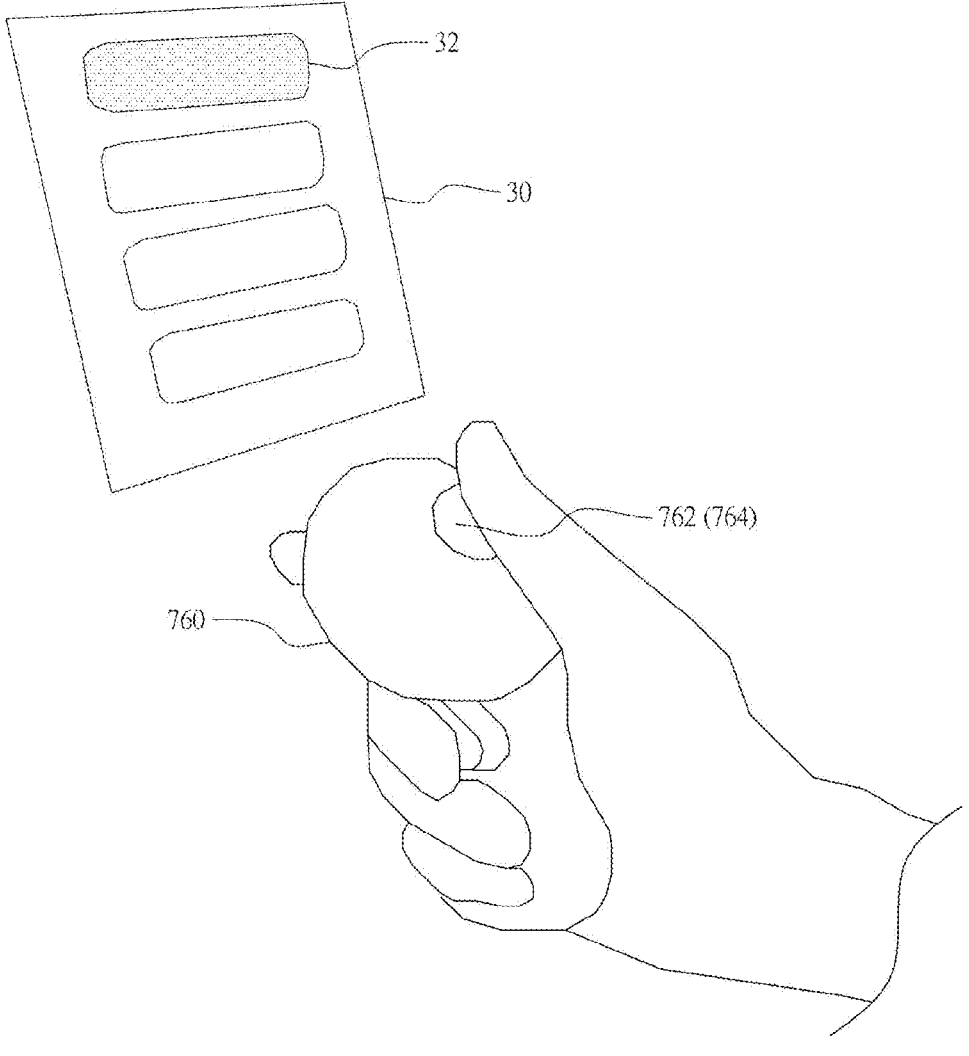
FIG. 9B shows an embodiment of steps S850 and S870.
Figure 9C:
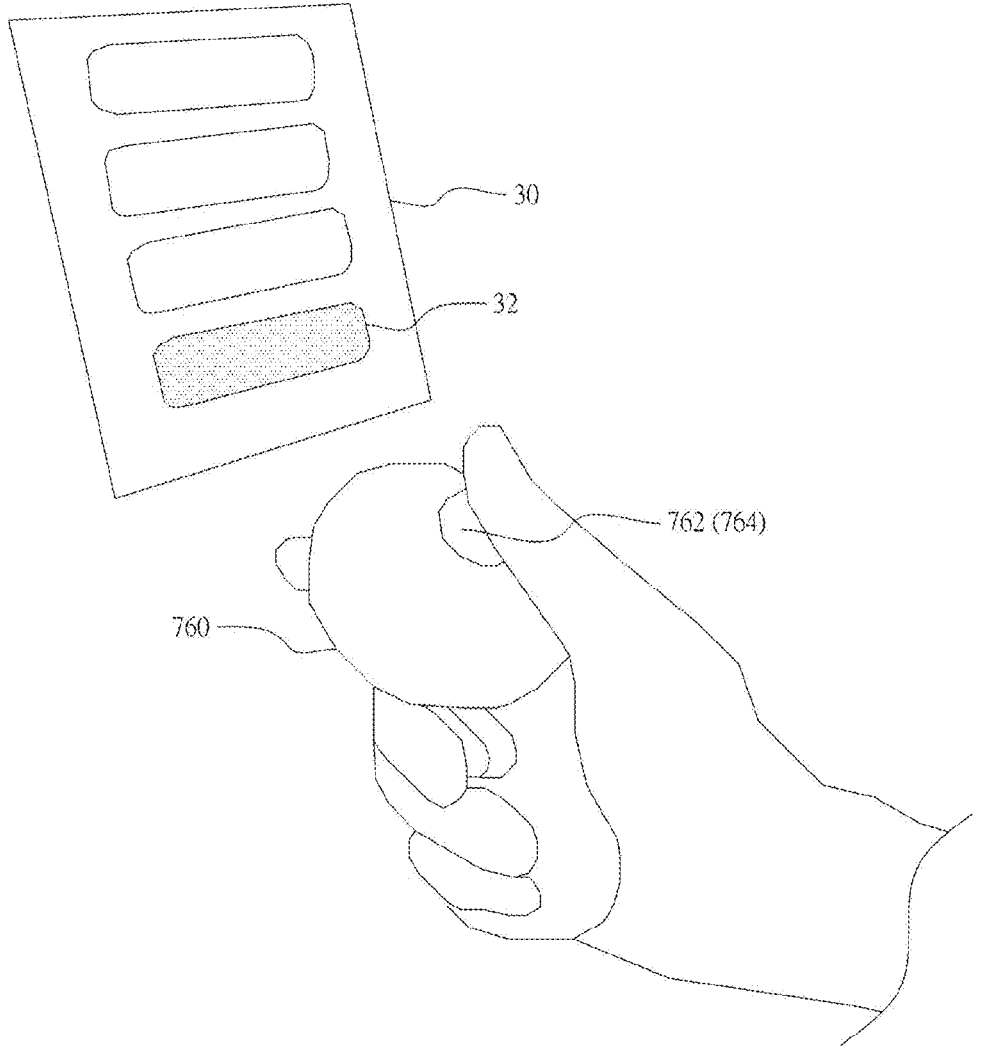
FIG. 9C shows an embodiment of step S890.

When the control handle 760 is activated, refer to FIG. 9A to FIG. 9C together. FIG. 9A shows an embodiment of step S830, FIG. 9B shows an embodiment of steps S850 and S870, and FIG. 9C shows an embodiment of step S890. In the figure, the field of view of the user and the control handle 760 being operated by the user are displayed on the same page for ease of description. This does not indicate that the control handle 760 is definitely displayed in the field of view of the user.

First, as shown in step S830, a shortcut window 30 is displayed in response to a first operation. The shortcut window 30 includes a plurality of options 32, and the first operation is a first press action of the key 762 of the control handle 760.

Specifically, after receiving an input signal corresponding to the first press action of the key 762, the processing unit 780 displays the shortcut window 30 in the field of view of the user. In an embodiment, the first press action is a press and hold action.

Then, as shown in step S850, one of the plurality of options 32 is selected in response to a second operation. The second operation is a swing action of the joystick 764. Next, as shown in step S870, a function corresponding to the selected option 32 is executed in response to a third operation. The third operation is a second press action of the key 762.

Specifically, after receiving an input signal corresponding to the swing action of the joystick 764, the processing unit 780 determines a swing direction corresponding to the input signal, and moves the selected option 32 according to the swing direction. Then, after receiving an input signal corresponding to the second press action of the key 762, the processing unit 780 immediately executes an application or instruction corresponding to the currently selected option 32. The second press action is different from the first press action. In an embodiment, the second press action is a single-tap action.

Then, as shown in step S890, the shortcut window 30 is closed in response to a fourth operation. The fourth operation is a third press action of the key 762.

Specifically, after receiving an input signal corresponding to the third press action of the key 762, the processing unit 780 immediately closes the shortcut window 30. In an embodiment, the third press action and the second press action are the same press action, but correspond to different options 32.

Figure 10:
FIG. 10 is a schematic block diagram of an extended reality device according to a fourth embodiment of the disclosure.
Figure 10:
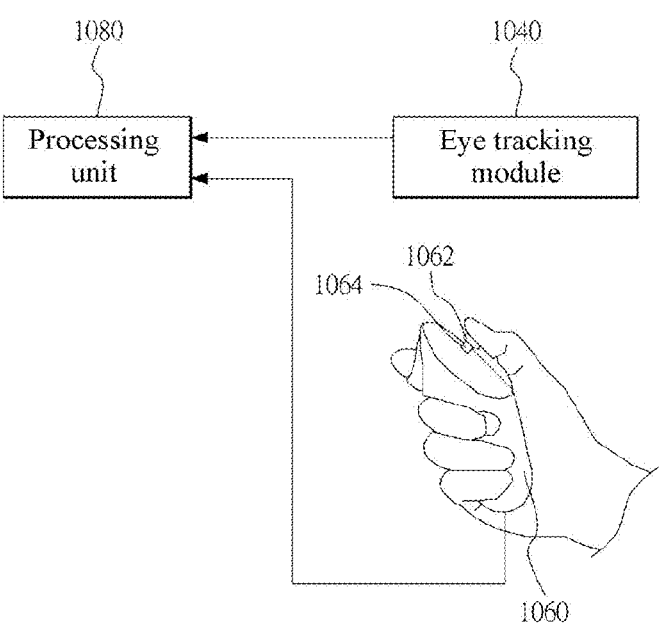
Figure 11:
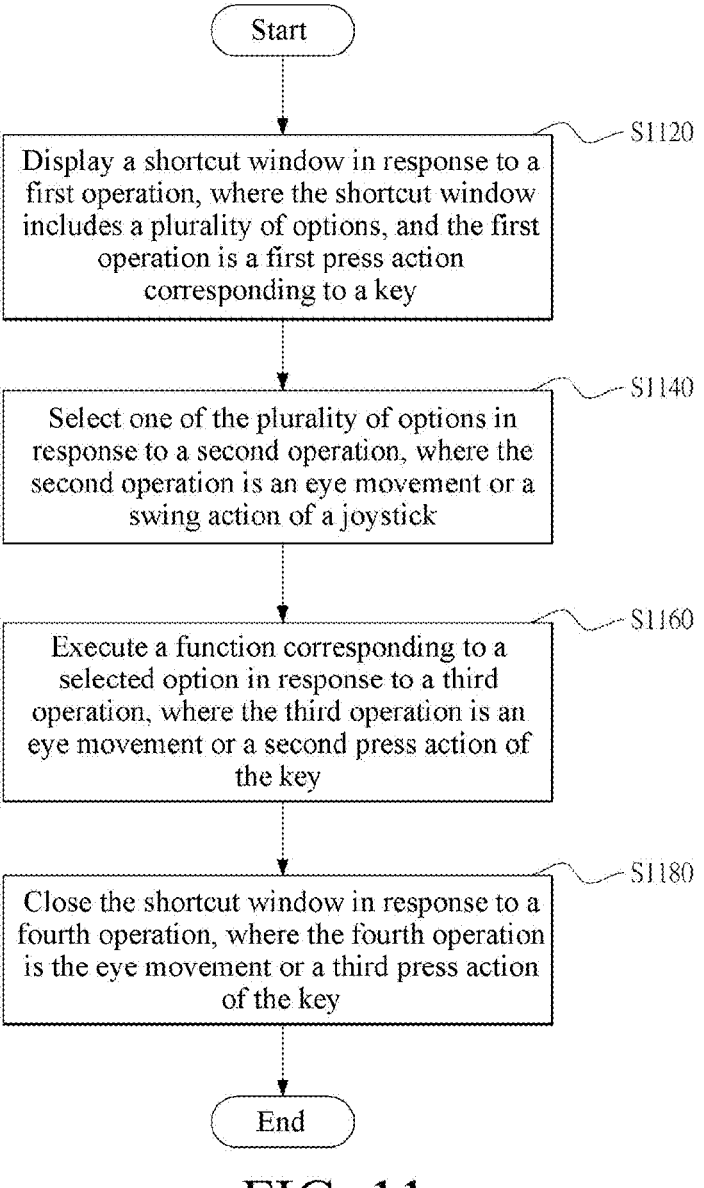
FIG. 11 is a flowchart of a control method according to a fourth embodiment of the disclosure.

FIG. 10 is a schematic block diagram of an extended reality device 1000 according to another embodiment of the disclosure. FIG. 11 is a flowchart of a control method according to another embodiment of the disclosure. The control method is applicable to the extended reality device 1000 shown in FIG. 10.

As shown in FIG. 10, the extended reality device 1000 includes an eye tracking module 1040, a control handle 1060, and a processing unit 1080. The eye tracking module 1040 is configured to detect an eye movement of a user. The control handle 1060 includes a key 1062 and a joystick 1064, and is configured to be operated by the user to generate an input signal. The processing unit 1080 is electrically coupled to the eye tracking module 1040 and the control handle 1060, and is configured to receive detection information from the eye tracking module 1040 and the input signal from the control handle 1060 to perform a corresponding operation.

As shown in FIG. 11, the control method provided in this embodiment includes the following steps.

First, as shown in step S1120, a shortcut window 30 is displayed in response to a first operation. The shortcut window 30 includes a plurality of options 32. The first operation corresponds to a first press action of the key 1062, as shown in FIG. 9A.

Then, as shown in step S1140, one of the plurality of options 32 is selected in response to a second operation. The second operation is an eye movement or a swing action corresponding to the joystick 1064.

Next, as shown in step S1160, a function corresponding to the selected option 32 is executed in response to a third operation. The third operation is another eye movement or a second press action corresponding to the key.

Figure 12A:
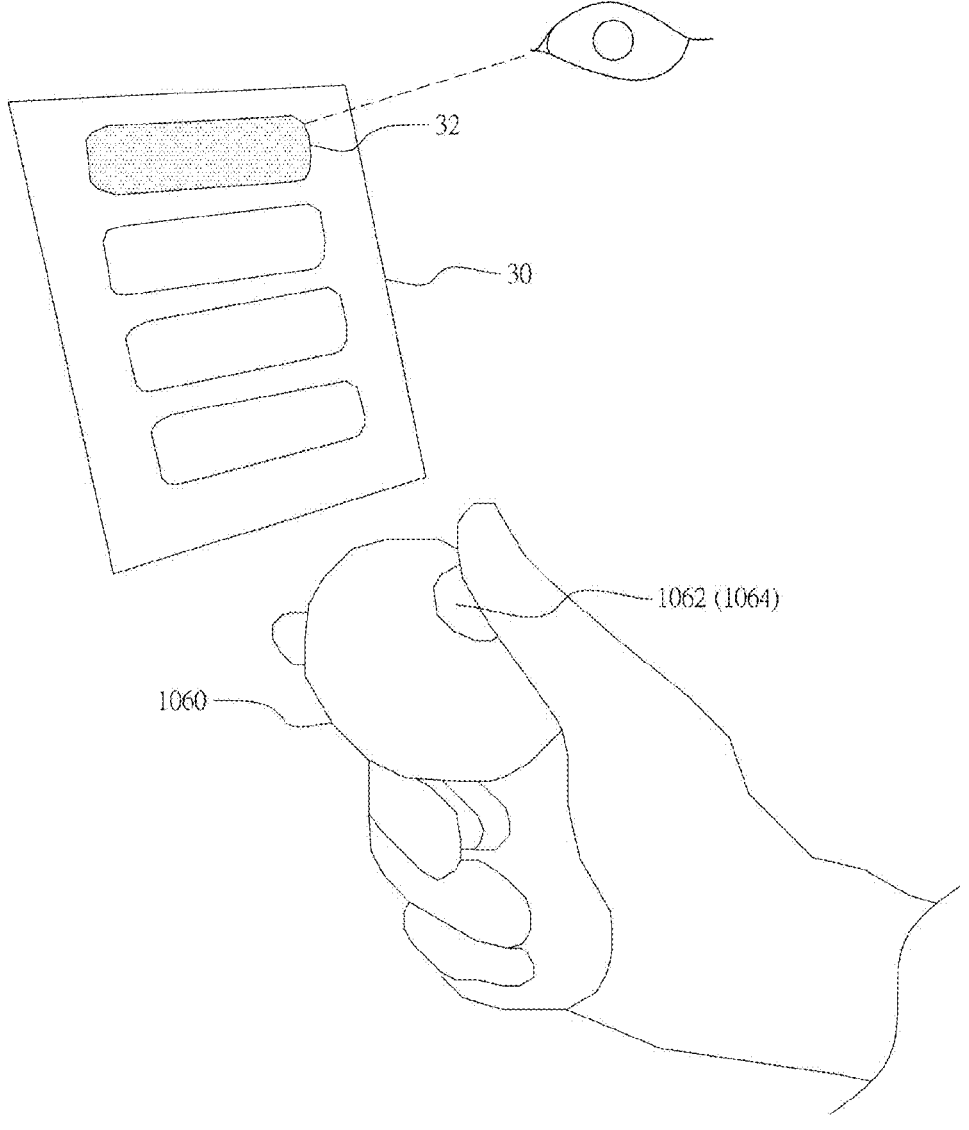
FIG. 12A shows an embodiment of steps S1140 and S1160.

Referring to FIG. 12A together, FIG. 12A shows an embodiment of steps S1140 and S1160. In the figure, the field of view of the user, an eye pattern, the control handle 1060 being operated by the user are displayed on the same page for ease of description. This does not indicate that the eye pattern and the control handle 1060 definitely appear in the field of view of the user.

As shown in the figure, when detecting, through the eye tracking module 1040, that the eye of the user moves up or down, the processing unit 1080 moves the selected option 32 according to a movement direction of the eye. When receiving an input signal corresponding to a swing action of the joystick 1064 of the control handle 1060, the processing unit 1080 moves the selected option 32 according to the swing action of the joystick 1064.

Then, when detecting, through the eye tracking module 1040, that the eye of the user has a gaze action (that is, does not move for more than a preset time), or receiving a second press action corresponding to the key 1062 of the control handle 1060, the processing unit 1080 immediately executes the application or instruction corresponding to the currently selected option 32.

Then, as shown in step S1180, the shortcut window 30 is closed in response to a fourth operation. The fourth operation is an eye movement or a third press action corresponding to the key 1062.

Figure 12B:
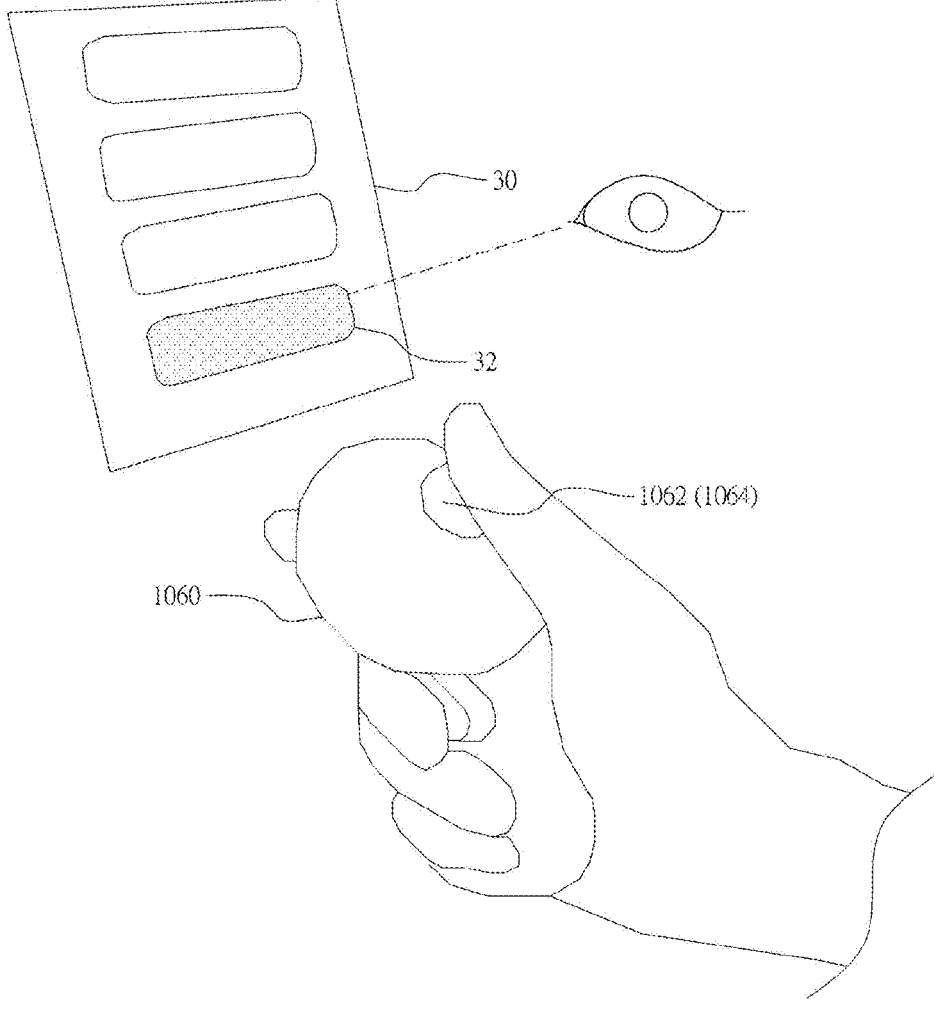
FIG. 12B shows an embodiment of step S1180.

Referring to FIG. 12B together, FIG. 12B shows an embodiment of step S1180. In the figure, the field of view of the user, the eye pattern, the control handle 1060 being operated by the user are displayed on the same page for ease of description. This does not indicate that the eye pattern and the control handle 1060 definitely appear in the field of view of the user.

As shown in the figure, the option 32 selected in step S1160 is to close the shortcut window 30 (that is, the option 32 of "X" in the figure). In this case, when detecting, through the eye tracking module 1040, that the eye of the user has a gaze action (that is, does not move for more than a preset time), or receiving a third press action corresponding to the key 1062 of the control handle 1060, the processing unit 1080 immediately executes the application or instruction corresponding to the currently selected option 32 to close the shortcut window 30. The third press action is a single-tap action.

Through the extended reality devices 100, 400, 700, and 1000 and the control method therefor provided in the disclosure, a user quickly activates a shortcut window 30 through a gesture operation or an eye movement, and selects an option 32 on the shortcut window 30 and executes the option. In this way, problems of uneasy operation and poor user experience of the extended reality devices 100, 400, 700, and 1000 are effectively resolved.

The above is merely exemplary embodiments of the disclosure, and does not constitute any limitation on the disclosure. Any form of equivalent replacements or modifications to the technical means and technical content disclosed in the disclosure made by a person skilled in the art without departing from the scope of the technical means of the disclosure still fall within the content of the technical means of the disclosure and the protection scope of the disclosure.

What is claimed is:

1. A control method, applicable to an extended reality device, wherein the extended reality device comprises a gesture detection module, and the control method comprises:

displaying a shortcut window in response to a first operation, wherein the shortcut window comprises a plurality of options;

selecting one of the plurality of options in response to a second operation; and executing a function corresponding to the selected one of the plurality of options in response to a third operation, wherein at least two of the first operation, the second operation, and the third operation are gesture operations, wherein the extended reality device comprises a control handle, the control handle comprises a key, and the control method further comprises determining whether the control handle is activated, wherein when the control handle is not activated, the first operation is an activation gesture, and wherein when the control handle is activated, the first operation is the activation gesture or a first press action of the key.

2. The control method according to claim 1, wherein the second operation is a selection gesture, the third operation is an execution gesture, and the activation gesture, the selection gesture, and the execution gesture are different from each other.

3. The control method according to claim 2, wherein the activation gesture is a palm turning gesture, the selection gesture is a finger pointing gesture, and the execution gesture is a finger tapping gesture.

4. The control method according to claim 1, wherein the extended reality device comprises an eye tracking module, the second operation is an eye movement or a selection gesture, the third operation is an execution gesture, and the activation gesture, the selection gesture, and the execution gesture are different from each other.

5. The control method according to claim 1, wherein the control handle further comprises a joystick, the first operation is the first press action corresponding to the key, the second operation is a swing action corresponding to the joystick, the third operation is a second press action corresponding to the key, and the first press action is different from the second press action.

6. The control method according to claim 5, wherein the first press action is a press and hold action, and the second press action is a single-tap action.

7. The control method according to claim 1, wherein the extended reality device further comprises an eye tracking module, the control handle further comprises a joystick, the first operation is the first press action corresponding to the key, the second operation is an eye movement or a swing action corresponding to the joystick, the third operation is a second press action corresponding to the key, and the first press action is different from the second press action.

8. The control method according to claim 1, further comprising:

closing the shortcut window in response to a fourth operation, wherein at least three of the first operation, the second operation, the third operation, and the fourth operation are gesture operations.

9. An extended reality device, comprising:
a gesture detection module;
an eye tracking module; and
a processing unit, electrically coupled to the gesture detection module and the eye tracking module, and configured to:
display a shortcut window in response to a first operation, wherein the shortcut window comprises a plurality of options;
select one of the plurality of options in response to a second operation; and
execute a function corresponding to the selected one of the plurality of options in response to a third operation,
wherein the extended reality device comprises a control handle, wherein the processing unit is electrically connected to the control handle, and the control handle comprises a key and a joystick,
wherein the processing unit is configured to determine whether the control handle is activated,
wherein when the control handle is not activated, the first operation is an activation gesture, and
wherein when the control handle is activated, the first operation is the activation gesture or a first press action of the key.

10. The extended reality device according to claim 9, wherein the extended reality device comprises a head-mounted device, and the eye tracking module and the processing unit are arranged in the head-mounted device.

11. The extended reality device according to claim 9, wherein the processing unit is configured to:
close the shortcut window in response to a fourth operation.

\* \* \* \* \*